United States Patent
Behzadpour

(10) Patent No.: US 11,214,349 B2
(45) Date of Patent: Jan. 4, 2022

(54) STRINGERS FOR AIRCRAFT SKIN STRUCTURES AND RELATED METHODS

(71) Applicant: The Boeing Company, Chicago, IL (US)

(72) Inventor: Forouzan Behzadpour, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 69 days.

(21) Appl. No.: 16/580,743

(22) Filed: Sep. 24, 2019

(65) Prior Publication Data

US 2021/0086886 A1 Mar. 25, 2021

(51) Int. Cl.
*B64C 3/18* (2006.01)
*B64C 1/06* (2006.01)
*B64C 1/12* (2006.01)

(52) U.S. Cl.
CPC .............. *B64C 1/069* (2013.01); *B64C 1/064* (2013.01); *B64C 1/12* (2013.01); *B64C 3/182* (2013.01)

(58) Field of Classification Search
None
See application file for complete search history.

(56) References Cited

U.S. PATENT DOCUMENTS

| | | |
|---|---|---|
| 2012/0234978 A1 | 9/2012 | Hernando Navas et al. |
| 2013/0287995 A1 | 10/2013 | Deobald et al. |
| 2015/0175250 A1 | 6/2015 | Deobald et al. |
| 2017/0246830 A1 | 8/2017 | Deobald et al. |
| 2019/0016436 A1 | 1/2019 | Stickler et al. |
| 2019/0047676 A1 | 2/2019 | Behzadpour et al. |
| 2019/0047677 A1 | 2/2019 | Cheng et al. |

FOREIGN PATENT DOCUMENTS

| | | |
|---|---|---|
| CA | 2829899 | 4/2015 |
| WO | 2014175798 | 10/2014 |

OTHER PUBLICATIONS

European Patent Office, "Extended European Search Report," issued in connection with European Patent Application No. 20198216.2, dated Feb. 25, 2021, 7 pages.

*Primary Examiner* — Alexander S Thomas
(74) *Attorney, Agent, or Firm* — Hanley, Flight & Zimmerman, LLC

(57) ABSTRACT

Stringers and aircraft skin structures and related methods are disclosed. An example apparatus includes a skin structure and a support. The support includes a first surface, a second surface opposite the first surface, and a tapered edge extending from the first surface. The example apparatus includes a first material disposed between a first portion of the support and a first portion of the skin structure to couple the second surface of the support to the skin structure and a second material disposed between a second portion of the support and a second portion of the skin structure. The second material is different than the first material. The second portion of the support includes at least a portion of the tapered edge.

20 Claims, 5 Drawing Sheets

STRINGERS FOR AIRCRAFT SKIN STRUCTURES AND RELATED METHODS

FIELD OF THE DISCLOSURE

This disclosure relates generally to aircraft skin structures, and, more particularly, to stringers for aircraft skin structures and related methods.

BACKGROUND

A stringer may be coupled to a skin structure (e.g., a panel) of an aircraft fuselage or wing to stiffen the skin structure and prevent deformation (e.g., buckling) of the skin while under load. The stringer can be coupled to the skin structure via an adhesive that forms an interface between the stringer and the skin.

Figure 1:
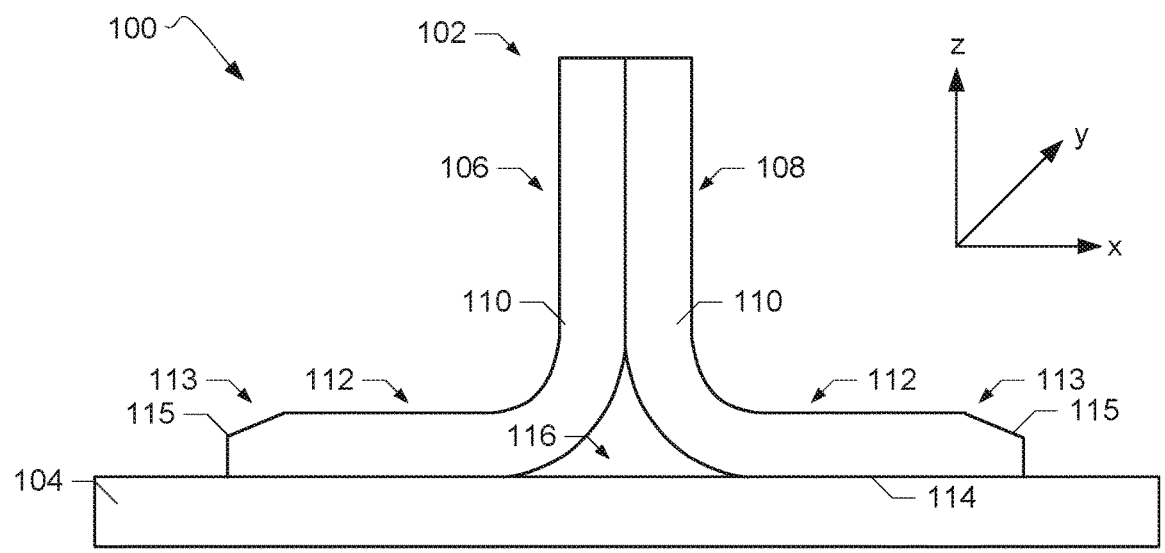
FIG. 1 is a front view of an example skin-stringer assembly in accordance with teachings of this disclosure and, in particular, shows a stringer coupled to a skin structure.

The figures are not to scale. Instead, the thicknesses of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

SUMMARY

An example apparatus includes a skin structure and a support. The support includes a first surface, a second surface opposite the first surface, and a tapered edge extending from the first surface. The example apparatus includes a first material disposed between a first portion of the support and a first portion of the skin structure to couple the second surface of the support to the skin structure and a second material disposed between a second portion of the support and a second portion of the skin structure. The second material is different than the first material. The second portion of the support includes at least a portion of the tapered edge.

An example layup includes a skin, a stringer, and a first material disposed between the skin and the stringer. The first material extends a first length between the skin and the stringer. The example layup includes a second material disposed between the skin and the stringer. The second material is different than the first material. The second material extends a second length between the skin and the stringer. The second material is disposed between the first material and an end of the stringer.

An example method includes applying a first material between a first portion of a stringer and a first portion of a skin structure to couple the first portion of the stringer to the first portion of the skin structure. An end of the first material and an end of the stringer defines a gap therebetween. The example method includes applying a second material in the gap. The second material is different than the first material.

An example method for distributing a load in a skin-stringer assembly includes coupling an end of a stringer of the skin-stringer assembly to a rib of an aircraft. The skin-stringer assembly includes a bonding layer disposed between a first portion of the stringer and a first portion of a skin and a stress distribution layer disposed between a second portion of the stringer and a second portion of the skin. A material of the bonding layer is different than a material of the stress distribution layer. The stress distribution layer is disposed proximate to the end of the stringer. The example method includes distributing a load between the stringer and the skin via the stress distribution layer. The stress distribution layer is to affect a distribution of shear stress associated with the bonding layer when the skin-stringer assembly is exposed to the load.

An example apparatus includes a skin panel, a stringer, and a bonding material extending between a first portion of the skin panel and a first portion of the stringer. The bonding material is to couple the first portion of the skin panel to the first portion of the stringer. The example apparatus includes a stress distribution layer extending between a second portion of the skin panel and a second portion of the stringer. The stress distribution material is to affect a distribution of a load between the skin panel and the stringer.

An example method includes distributing stresses associated with a load on a skin-stringer assembly via a bonding layer at a first portion of the skin-stringer assembly, wherein at the first portion of the skin-stringer assembly, the bonding layer extends between a first portion of a skin of the skin-stringer assembly and a first portion of a stringer of the skin-stringer assembly. The example method includes distributing the stresses associated with the load via a stress distribution layer at a second portion of the skin-stringer assembly, wherein at the second portion of the skin-stringer assembly, the stress distribution layer extends between a second portion of the skin and a second portion of the skin-stringer assembly. The bonding layer includes a first material and the stress distribution layer includes a second material. The second material is different than the first material.

DETAILED DESCRIPTION

A stringer of an aircraft serves as a primary axial load carrying member of, for instance, a wing panel of the aircraft. In other examples, the stringer may be disposed in a fuselage of the aircraft. A skin-stringer assembly can be formed via a composite layup to couple the stringer to a skin structure (e.g., a panel) of, for instance, the aircraft wing to stiffen the skin structure and prevent deformation (e.g., buckling) of the skin while under load. The layup can include an adhesive material to couple the stringer to the skin and form a bonded joint. The skin-stringer assembly can be coupled to, for example, a rib of the aircraft wing.

Stringer axial loads can cause high shear stresses at a runout region of the skin-stringer assembly, or an area proximate to an end of the stringer that couples to the rib. The shear stresses may be transferred to the skin, which can cause high peel-off stresses in the skin. Because the adhesive used to couple the skin to the stringer is typically stronger than the resin used to form the skin, any failure of the bonded joint would be more likely to occur in the skin. A magnitude of the peel-off load in the skin is affected by the properties of the stringer runout region due to the concentration of stresses at that region. Skin-stringer assemblies that provide for increased pull-off strength of the stringer (e.g., a force required to pull off the stringer) can reduce a peel-off moment of the stringer, thereby reducing skin peel-off stresses and preventing peeling at a bondline between the stringer and the skin.

In some instances, anomalies in the skin-stringer assembly can develop during processing of the layup, such as during cool-down of the layup from an autoclave temperature of, for instance, 350° F., to room temperature. Such anomalies can include wrinkles, bow wave, and/or warpage (e.g., twisting or bending) and can occur at the stringer runout region. The formation of anomalies can be exacerbated by the use of materials in the layup that are incompatible with respect to material properties such as Poisson's ratio. The thermally induced random anomalies can reduce strength and stiffness of the stringer. In some instances, the anomalies can increase mechanical complexities in coupling the skin-stringer assembly to the rib. For instance, techniques such as shimming may be employed to compensate for anomalies due to warpage of the skin-stringer assembly and securely couple the skin-stringer assembly to the rib. However, such anomaly compensation techniques can increase the weight of parts used in the aircraft, which can affect aircraft performance. Further, such compensation techniques can increase manufacturing processes and costs without addressing the cause of the anomaly.

Some known skin-stringer assemblies undergo a laminate softening process to increase strength and/or stability of the skin-stringer assembly. However, rather than reducing anomalies, laminate softening can have undesirable effects on the skin-stringer assembly. For instance, laminate softening affects the stiffness and/or geometry of the stringer. The changes to the stringer stiffness and/or geometry can induce residual stresses at the stringer runout. Such changes, particularly in combination with the termination of the stiff adhesive at the runout and/or other structural design changes to the stringer at the runout (e.g., changes to the stringer cross-sectional area), can increase the concentration of the stresses at the runout region. Further, laminate softening can result in material property differences or mismatches between the components of the skin-stringer assembly. For instance, laminate softening can introduce changes in the elastic modulus and/or shear modulus of the stringer, which can weaken the stringer. Also, mismatches between the material properties of the skin, stringer, and/or adhesive can weaken the bondline between the skin and the stringer, reduce creep strength of the bondline, and induce secondary thermal and/or mechanical loads and residual stresses at the runout region of the skin-stringer assembly.

Disclosed herein are example skin-stringer assemblies that compensate for increased stresses at the runout region of the skin-stringer assembly and strengthen the bonded joint formed between the skin and the stringer. Example skin-stringer assemblies disclosed herein include stringers having flanges with tapered thickness and increased width proximate to the runout region. As the thickness of the stringer flange decreases, the thickness of the skin is increased. As a result, example skin-stringer assemblies disclosed herein provide for a smooth transition of the stringer load into the skin rather than dumping the stringer load into the skin at the runout region. Further, fabrication of example skin-stringer assemblies disclosed herein does not involve laminate softening, which can cause imbalances in stiffness and affect compatibility of material properties (e.g., Poisson's ratio) of the components of the layup. Rather, example skin-stringer assemblies disclosed herein have improved compatibility between the components of the skin-stringer assembly as compared to known skin-stringer assemblies that include portions softened via laminate softening. As a result of the material compatibility between components, example skin-stringer assemblies disclosed herein have increased pull-off strength of the stringer, minimize layup-related mechanical thermal induced residual stresses and anomalies, and promote strength of the composite materials.

In example skin-stringer assemblies disclosed herein, the adhesive or bonding layer disposed between the stringer and skin ends before the end of the stringer. A material such as non-structural fiberglass is disposed between the skin and the stringer to replace the adhesive proximate to the runout region. The non-structural fiberglass serves as a stress distribution layer. In some examples, mechanical fastener(s) are used to couple the skin to the stringer proximate to the non-structural fiberglass instead of the adhesive. Thus, adhesive stresses (e.g., shear stresses) at the runout region are reduced as compared to known skin-stringer assemblies in which the adhesive layer extends to the end of the runout region. The reduced adhesive stresses in the examples disclosed herein prevents creep and improves durability of the adhesive interface. Further, any induced peel stresses in the adhesive layer are constrained or directed away from the skin at the runout region due to shortening of the adhesive layer, which reduces the formation of stresses at the runout region and improves joint strength. As result of the reduction in geometry-related residual stresses and layup defects, example skin-stringer assemblies disclosed herein have strengthened skin-stringer interfaces and improved flexibility over known skin-stringer assemblies that do not include the stress distribution layer including fiberglass or other reinforcing material, which increases pull-off strength of the stringer and avoids skin peel-off.

FIG. 1 is a front view of an example skin-stringer assembly 100 in accordance with teachings of this disclosure and including a support, or stringer 102, coupled to skin 104. The skin 104 may be a portion or panel of a skin of, for instance, a fuselage or wing of an aircraft.

The example stringer 102 includes a first stiffener segment 106 coupled to a second stiffer segment 108. The first stiffener segment 106 of the example stringer 102 of FIG. 1 is a mirror image of the second stiffener segment 108. Each of the first stiffener segment 106 and the second stiffener segment 108 includes a web 110 and a flange 112 extending from the web 110. In the example of FIG. 1, at least a portion of the web 110 of each stiffener segment 106, 108 is perpendicular to the skin 104. Also, at least a portion of the flange 112 of each stiffener segment 106, 108 is parallel to the skin 104. In FIG. 1, the flanges 112 are mirror images of one another. In the example of FIG. 1, an end 113 of each flange 112 includes a chamfer 115. The chamfer 115 can be, for examples, 15 degree chamfer at each end 113. The chamfer 115 provides for increased pull-off strength and reduced peel-off moment of the stringer 102 as compared to flanges that have 90 degree or 45 degree chamfer.

As discussed herein, in the example of FIG. 1, the stringer 102 is coupled to the skin 104 via a bonding layer (FIG. 3) that defines a bondline 114, or a plane between the stiffener segments 106, 108 and the skin 104. As illustrated in FIG. 1, a gap 116 is defined between the first and second stiffener segments 106, 108 and at portion of skin 104. The gap 116 can be filled with a material such as a noodle, a carbon fiber gap filler, etc.

Figure 2:
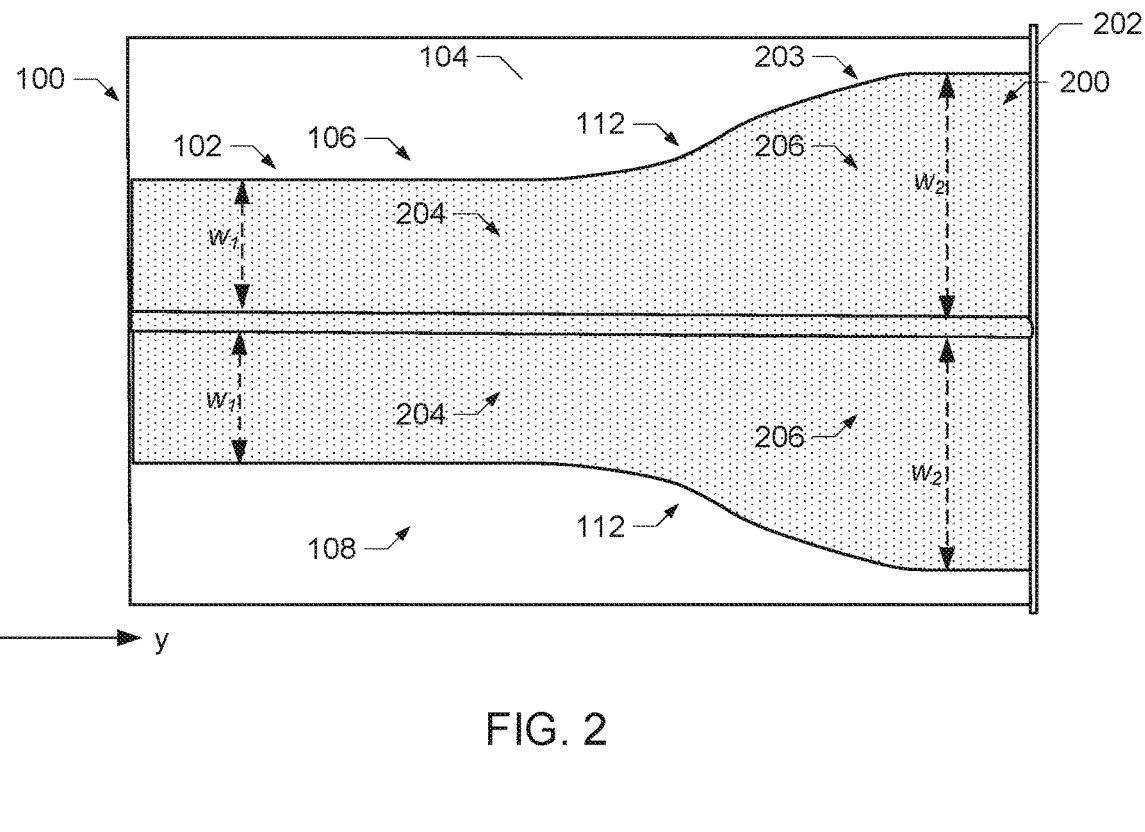
FIG. 2 is a top view of the example skin-stringer assembly of FIG. 1.

FIG. 2 is a top view of the example skin-stringer assembly 100 of FIG. 1, showing a portion of the example stringer 102 and the skin 104. As shown for illustrative purposes in FIG. 2, in operation, a first end or tip 200 of the stringer 102 intersects a rib 202. In use, the rib 202 may extend from, for instance, a leading edge of a wing of an aircraft including the skin 104 to a trailing edge of the wing to form a frame of the wing. A runout region 203 of the skin-stringer assembly 100 is defined proximate to the end 200 of the stringer 102 that couples to the rib 202.

The flanges 112 of the respective stiffener segments 106, 108 of the example stringer 102 widen as the flanges 112 extend toward the runout region 203. As shown in FIG. 2, each of the flanges 112 of the first and second stiffener segments 106, 108 includes a first portion 204 having a first width $w_1$ and a second portion 206 having a second width $w_2$, where the second width $w_2$ of the second portion 206 is greater than first width $w_1$ of the first portion 204. The second portions 206 of the respective flanges 112 are disposed proximate to the runout region 203. The increased width of the respective flanges 112 at the runout region 203 increases an area of the end 200 of the stringer 102. The increased area of the end 200 of the stringer 102 helps to strengthen the skin-stringer assembly 100 at the runout region 203 where the assembly is exposed to increased stresses and bending forces. Thus, an area of the interface between the stringer 102 and the skin 104 is increased at the runout region 203, which helps reduce the concentration of loads transferred to the skin 104 at the runout region 203. The increased interface area of the respective flange(s) 112 also helps to increase a pull-off strength of the stringer 102. The size of the first and second portions 204, 206 of the flanges 112 can be based on variables such as a size of the aircraft including the stringer 102, the number of stringers, the shape of the stringer 102, etc.

Figure 3:
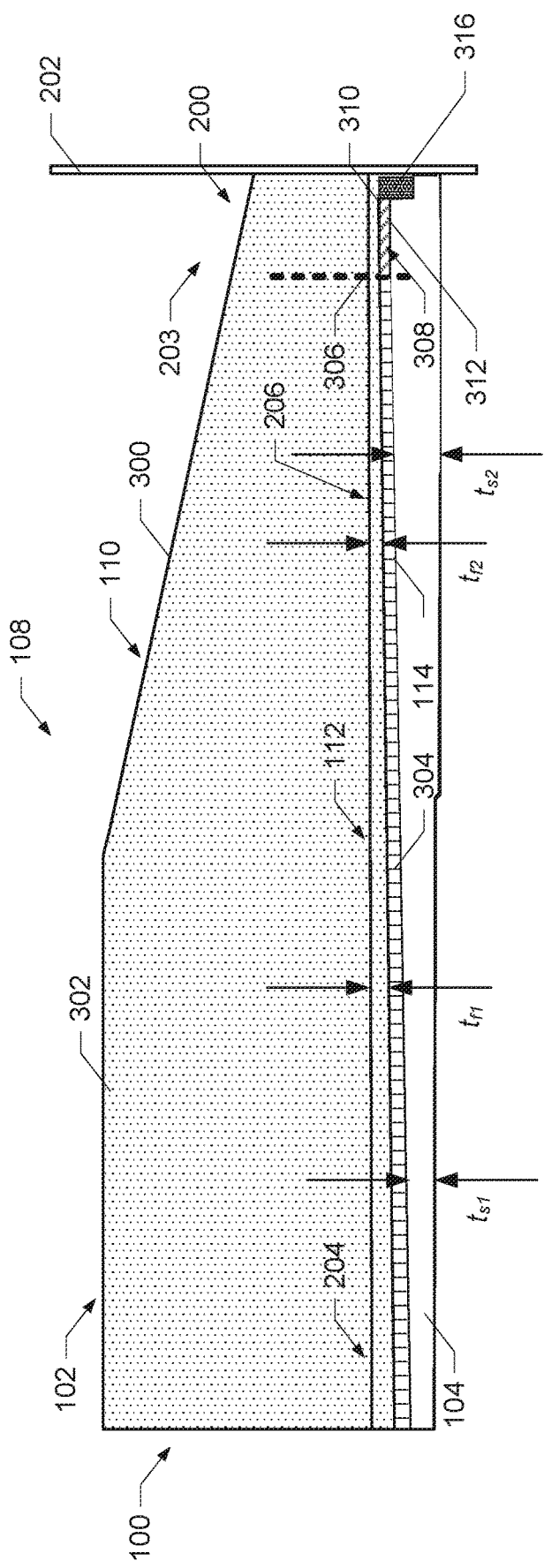
FIG. 3 is a partial side view of the example skin-stringer assembly of FIG. 1.

FIG. 3 is a partial side view of the example skin-stringer assembly 100 of FIGS. 1 and 2 and, in particular, illustrates a portion of the second stiffener segment 108 of the stringer 102 including the web 110 and the flange 112. A corresponding portion of the first stiffener segment 106 of the example stringer 102 is a mirror image of the portion of the second stiffener segment 108 shown in FIG. 3.

As shown in FIG. 3, the substrate web 110 of the second stiffener segment 108 includes a tapered edge 300 extending from a first surface 302 of the substrate web 110 toward the first end 200 of the stringer 102 where the stringer 102 couples to the rib 202 (where the rib 202 is shown for illustrative purposes in FIG. 3). In the example of FIG. 3, the tapered edge 300 is at least partially disposed in the runout region 203 of the stringer 102. In some examples, the edge 300 of the substrate web 110 is tapered at an angle of approximately fifteen (15) degrees relative to the first surface 302. In other examples, the edge 300 of the substrate web 110 is tapered at an angle greater than or less than fifteen (15) degrees. The gradual slope of the of the tapered edge 300 of the stringer web 110 reduces bending forces (e.g., beam column effect) to which the stringer 102 is subject and prevents buckling of the stringer 102 under load.

As shown in FIG. 3, the first portion 204 of the flange 112 of the second stiffener segment 108 of the example stringer 102 distal to the end 200 of the stringer 102 has a first thickness $t_{f1}$ and the second portion 206 of the flange 112 proximate to the end 200 of the stringer 102 has a second thickness $t_{f2}$, where the second thickness $t_{f2}$ less than the first thickness $t_1$ of the first portion 204. Thus, the thickness of the flange 112 of the example stringer 102 is tapered between the first and second portions 204, 206 of the flange 112. As a result, in the example of FIG. 3, the second portion 206 of the flange 112 has a greater width and a reduced thickness as compared to the first portion 204 of the flange 112. As discussed herein, the reduced thickness of the stringer flange 112 improves flexibility of the stringer flange 112 with the skin 104.

As also shown in FIG. 3, a thickness of the skin 104 increases as the thickness of the flange 112 decreases. For instance, the skin 104 has a first thickness $t_{s1}$ proximate to the first portion 204 of the flange 112 and a second thickness $t_{s2}$ proximate to the portion 206 of the flange 112, where the second thickness $t_{s2}$ is greater than the first thickness $t_{s1}$ of the skin 104. Thus, in the example skin-stringer assembly 100 of FIG. 3, there is an inverse relationship between the thickness of the flange 112 and the skin 104. The inverse relationship between the thickness of the flange 112 and the skin 104 at the runout region 203 reduces differences in stiffness between the flange 112 and the skin 104 and provides for a stable transition of loads transferred between the flange 112 and the skin 104. In some other examples, such as in skin-stringer assemblies including interleaved skin, the thickness of the skin is not increased.

The example stringer 102 of FIG. 3 is coupled to the skin 104 via an adhesive 304 that extends between a portion of the skin 104 and a portion of the flange 112. The adhesive 304 forms a bonding layer between the skin 104 and the flange 112. The adhesive 304 can include a material suitable for primary structure composite bonding and compatible with epoxy resin material systems that can be cured at an elevated temperature (e.g., 350° F. or higher). As represented by line 306 in FIG. 3, the adhesive 304 terminates prior to the end 200 of the stringer 102 and, thus, prior to the end of the runout region 203 of the skin-stringer assembly 100. In some examples, the adhesive 304 ends no less than ¼ inch before the end 200 of the stringer 102.

As a result of the adhesive 304 terminating prior to the end 200 of the stringer 102, a gap 308 is formed at the bondline 114 between the skin 104 and a skin-facing surface 310 of the flange 112 of the second stiffener segment 108. In the example of FIG. 3, the gap 308 defined between the skin 104 and the skin-facing surface 310 of the flange 112 is filled with a gap filler material 312. In the example of FIG. 3, the gap filler material 312 includes fiberglass or other suitable reinforcing material. As disclosed herein, the gap filler material 312 can include material(s) that are selected based on material properties (e.g., thermal material properties, elastic material properties) of the stringer 102 and/or skin 104.

As illustrated in FIG. 3, the gap filler material 312 is disposed in the gap 308 adjacent the adhesive 304 to define the bondline 114. As disclosed herein, as a result of the termination of the adhesive 304 prior to end 200 of the stringer 102 and inclusion of the reinforcing material 312 (e.g., fiberglass) at the stringer end 200, adhesive shear stresses are directed away from the runout region 203. Thus, the gap filler material 312 serves as a stress distribution layer that helps to reduce stresses experienced by skin-stringer assembly 100 at the runout region 203, including reducing peel-off stresses experienced by the skin 104 at the runout region 203.

The length of the adhesive 304 relative to the length of the gap filler material 312 can be selected to avoid weakening the coupling between the stringer 102 and the skin panel 104 by having too little adhesive along the length of the skin-stringer interface. Thus, in some examples, a length of the adhesive 304 is greater than a length of the gap filler material 312. Conversely, the length of the gap filler material 312 relative to the length of the adhesive 304 can be selected so as to not to be too short to provide any benefit with respect to directing the adhesive shear stresses away from the runout region 203.

In the example of FIG. 3, the materials of gap filler material 312, the adhesive 304, the stringer 102, and the skin 104 are selected to be compatible with respect to one or more material properties, such as thermal material properties and/or elastic material properties. For instance, in the example skin-stringer assembly 100 of FIGS. 1-3, a Poisson's ratio associate with the stringer 102 may be 0.37, a Poisson's ratio of the adhesive 304 may be 0.34, and a Poisson's ratio of the skin may be 0.32. As another example, for the skin-stringer assembly 100 of FIGS. 1-3, a coefficient of thermal expansion of the stringer 102 may be 2.78e-6, the coefficient of thermal expansion of the adhesive may be 1.26e-6, and coefficient of thermal expansion of the skin may be 1.96e-6. The compatibility of the Poisson's ratios and/or the coefficients of thermal expansion of the components of the skin-stringer assembly 100 improves strength of the skin-stringer assembly 100 and reduces defects such as warpage and cracking of the noodle disposed in the gap 116 (FIG. 1), as the components of the skin-stringer assembly 100 respond similarly to loads and/or thermal changes.

The gap filler material 312 may be selected so as to expand at a similar rate as the other materials of the skin-stringer assembly 100 (e.g., the stringer web 110) when exposed to heat (e.g., during formation of the skin-stringer assembly 100). The gap filler material 312 may be selected so as to contract at a similar rate as other materials of the skin-stringer assembly 100 during cooling. The similar expansion and contraction rates of the gap filler material 312, the adhesive 304, the stringer 102, and the skin 104 prevents separation of the stringer 102 and the skin 104 at the bondline 114 defined between the stringer 102 and the skin 104. The compatibility between the materials of the skin-stringer assembly 100 minimizes or prevents cracking of the noodle or the material disposed in the gap 116 formed between the stringer stiffener segments 106, 108 (FIG. 1), which increases pull-off strength of the stringer 102.

In some examples, one or more portions of the stringer 102 are coupled to the skin 104 via one or more mechanical fasteners 316 (e.g., tension rated fastener(s)). The mechanical fastener(s) 316 provide means for coupling the stringer 102 to the skin 104 in view of the termination of the adhesive 304 prior to the end of stringer 102. In some examples, the mechanical fastener(s) 316 are disposed in the runout region 203, as shown in FIG. 3. In such examples, the mechanical fastener(s) 316 transfer the load from the stringer 102 to the skin 104 at the runout region 203 and can provide for increased stability at the runout region 203 as compared to the adhesive 304, which is subject shear stresses. Additionally or alternatively, the mechanical fastener(s) 316 can be disposed at other locations along the skin-stringer interface (e.g., at the bonding layer formed by the adhesive 304).

Figure 4:
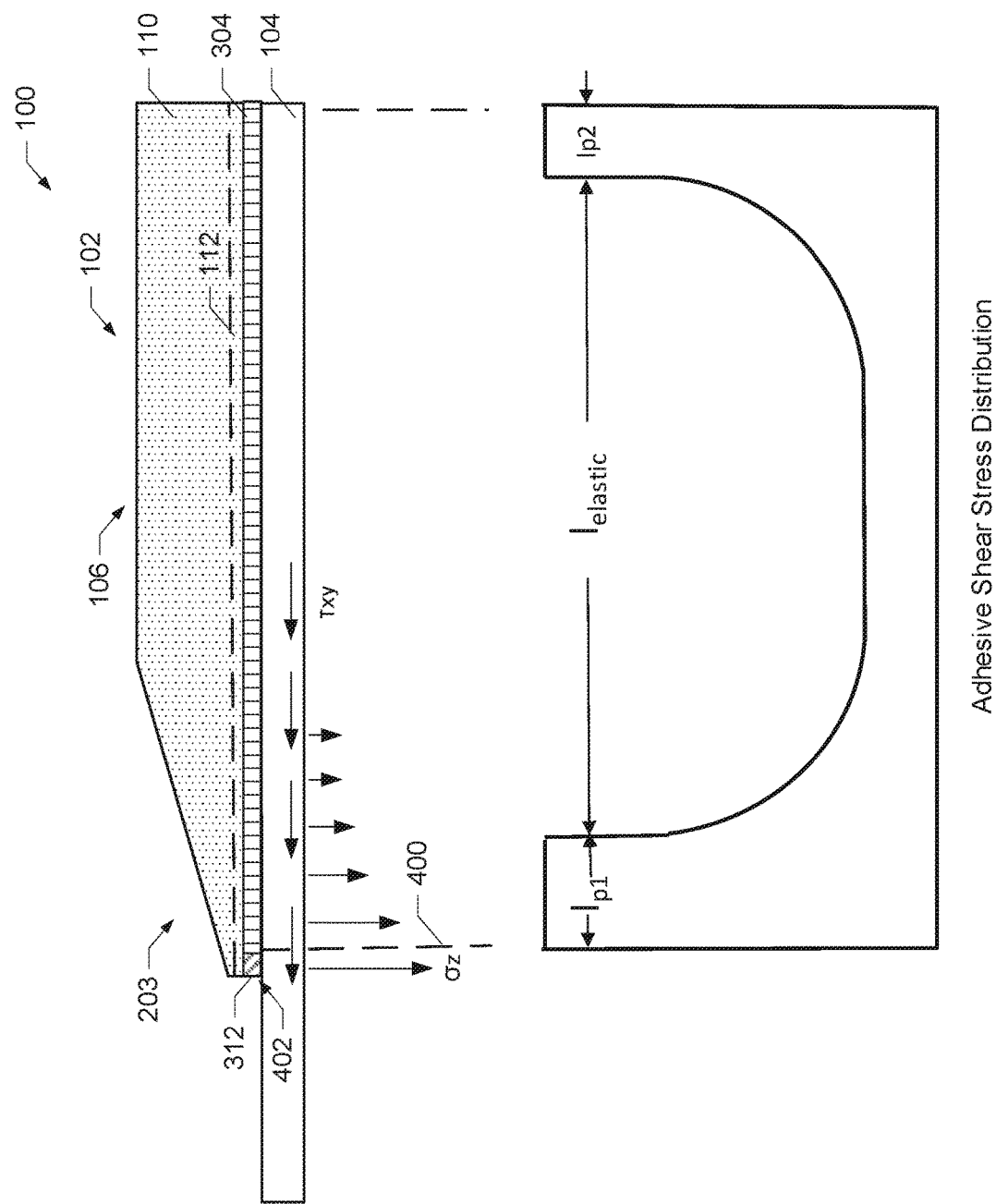
FIG. 4 is a force diagram illustrating the distribution of loads at a flange of the example skin-stringer assembly of FIG. 1.

FIG. 4 is a force diagram illustrating distribution of the adhesive shear stresses at the flange 112 of the first stiffener segment 106 of the example skin-stringer assembly 100 of FIGS. 1-3. In particular, FIG. 4 illustrates a portion of the first stiffener segment 106 of the stringer 102 including the web 110 and the flange 112 at the runout region 203. As represented by line 400 in FIG. 4, shear stresses associated with the adhesive 304 are directed away from a tip 402 of the runout region 203 as a result of the termination of the adhesive 304 prior to the tip 402 of the runout region 203. Rather, the gap filler material 312 (e.g., fiberglass) or stress distribution layer helps to absorb the adhesive shear stresses and reduces the concentration of stresses at the runout region 203 that are transferred to the skin 104. As a result, the stresses acting on the skin 104 at the runout region 203 are reduced, which reduces peel-off stresses in the skin 104. Also, in some examples, the skin stiffness is equal or substantially equal to the stringer stiffness (i.e., $l_{p1}=l_{p2}$ in FIG. 4, where p refers to plastic). Accordingly, an interface between the stringer 102 and the skin 104 is strengthened and stresses such as creep stresses that can lead to failure of the bonded joint formed between the stringer 102 and the skin 104 are minimized.

Figure 5:
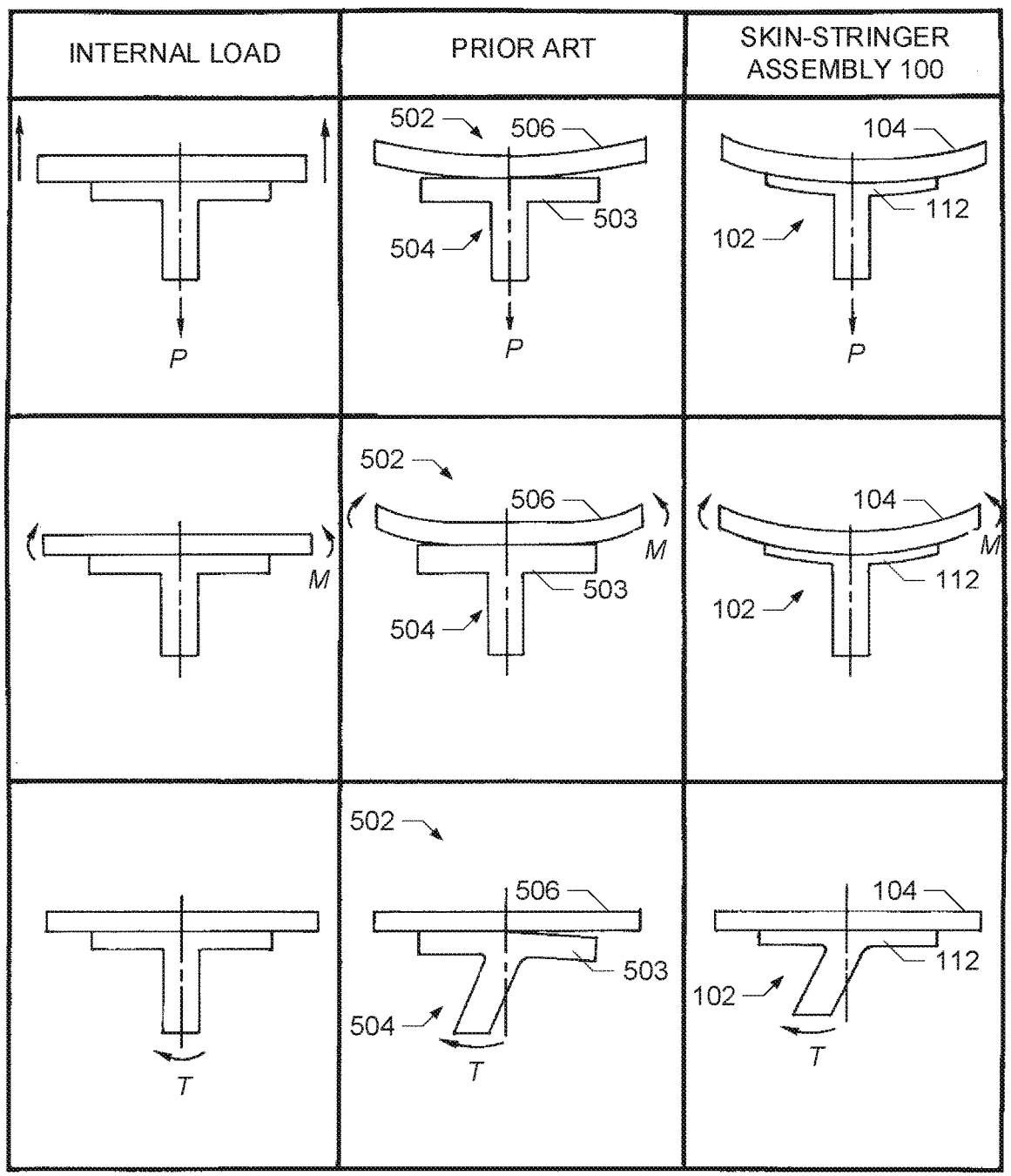
FIG. 5 is a table illustrating example responses of a skin-stringer assembly known in the art and the example skin-stringer assembly disclosed herein when under load.

FIG. 5 is a table 500 illustrating the increased flexibility of the example skin-stringer assembly 100 of FIGS. 1-3 when under load as compared to a known skin-stringer assembly 502 due to the reduced thickness of the flange(s) 112 of the stringer 102. As shown in the second column of the table 500 of FIG. 5, when the known skin-stringer assembly 502 is under a pulling force P, a flange 503 of a stringer 504 of the known skin-stringer assembly 502 does not flex with skin 506 to which the stringer 504 is coupled. Instead, the stringer 504 is pulled away from the skin 506 as a result of a peel-off moment of the stringer 504 and peel-off stresses in the skin 506. Similarly, as shown in FIG. 5, peeling at the bondline between the flange 503 of the stringer 504 and the skin 506 of the skin-stringer assembly 502 of FIG. 5 can occur in response to a moment force M and/or a torsion force T.

However, as shown in the third column of the table 500 of FIG. 5, the example skin-stringer assembly 100 of FIGS. 1-3 responds to load with increased flexibility as compared to the known skin-stringer assembly 502. For example, when under the pulling force P, the flange 112 of the stringer 102 of the example skin-stringer assembly 100 of FIGS. 1-3 flexes with the skin 104. In particular, the reduced thickness of the flange 112 of the skin-stringer assembly 100 (FIG. 2)

provides for improved flexibility of the skin-stringer assembly 100 to increase the pull-off strength of the stringer 102. Thus, a peel-off moment of the stringer 102 is reduced as compared to the stringer 504 of the known skin-stringer assembly 502 of FIG. 1. Similarly, as shown in FIG. 5, the flange 112 of the stringer 102 of the example skin-stringer assembly 100 of FIGS. 1-3 flexes with the skin 104 in response to the moment force M and/or the torsion force T.

Figure 6:
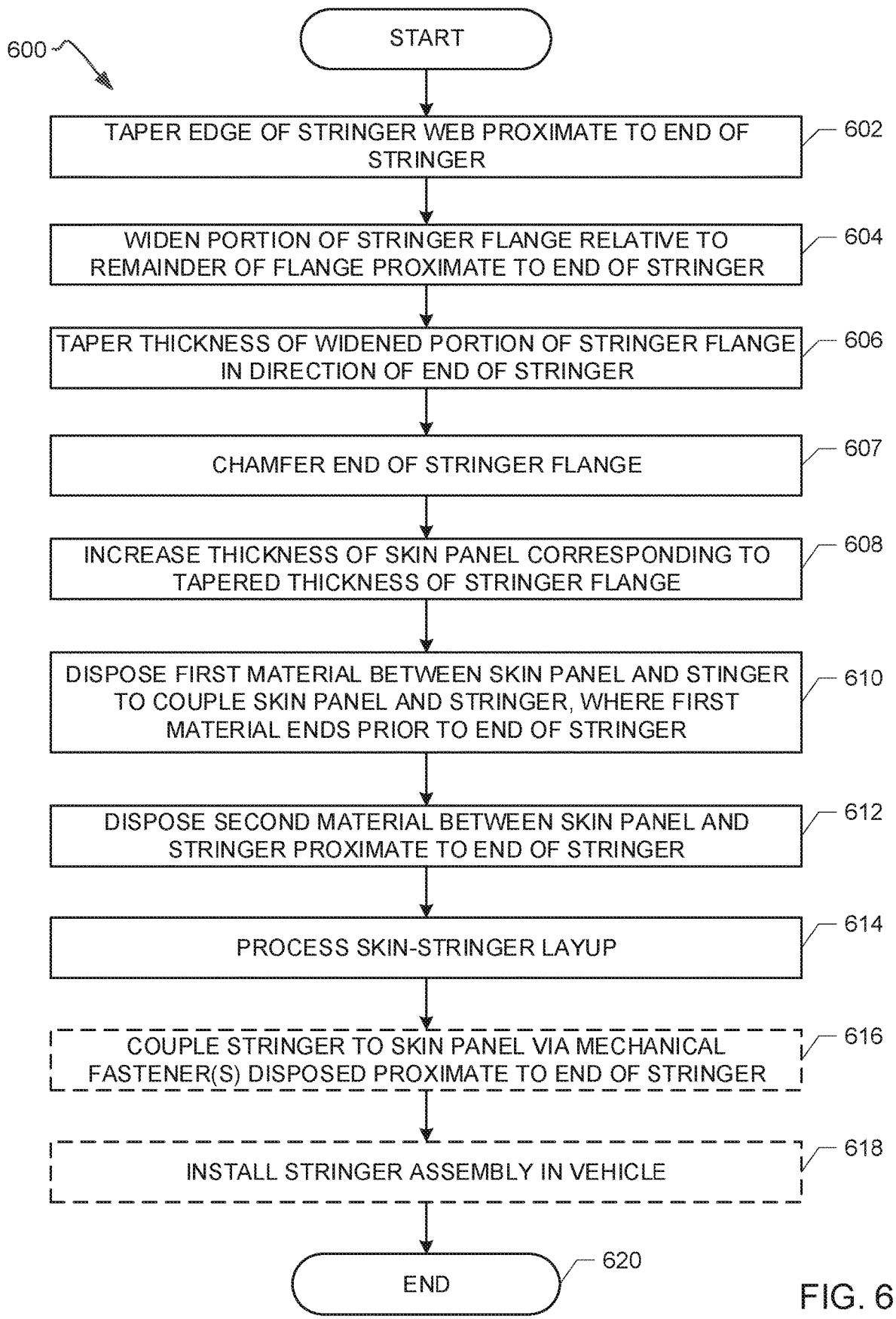
FIG. 6 is a flowchart of an example method for fabricating a skin-stringer assembly in accordance with teachings of this disclosure.

FIG. 6 is a flowchart of an example method 600 for fabricating the example skin-stringer assembly 100 of FIGS. 1-3. In some examples, the example method 600 includes forming a stringer such as the example stringer 102 including tapering an edge 300 of a stringer web 110 proximate to an end 200 of the stringer 102 that will be coupled to a rib 202 (block 602). The example method 600 can include widening a portion 206 of a flange 112 of the stringer 102 relative to a remaining portion 204 of the flange 112 proximate to the end 200 of the stringer 102 (block 604). The example method 600 can include tapering a thickness of the widened portion 206 of the flange 112 in a direction toward the end 200 of the stringer 102 (block 606). The example method 600 can include chamfering an end of the flange 112 (block 607). The chamfer can have an angle of, for instance, fifteen (15) degrees.

In other examples, the example method 600 of FIG. 6 begins after obtaining the stringer 102 including the tapered edge 300 of the web 110, the widened portion 206 of the flange 112, and the tapered flange thickness. The example method 600 of FIG. 6 includes increasing a thickness of a skin panel to which the stringer is to be coupled corresponding to the area of the stringer flange having decreased thickness (block 608). For example, the thickness of the skin 104 is adjusted (e.g., increased) such that there is an inverse relationship between the thickness of the skin 104 and the thickness of the flange(s) 112 of the stringer 102 proximate to the end 200 of the stringer 102 at the runout region 203.

The example method 600 of FIG. 6 includes disposing a first material between the skin panel and the stringer to couple the skin panel to the stringer, where the first material ends prior to the end of the stringer (block 610). For example, the adhesive 304 of the example skin-stringer assembly 100 of FIG. 3 is disposed between the stringer 102 and the skin panel 104 and ends prior to the end 200 of the stringer 102.

The example method 600 of FIG. 6 includes disposing a second material between the skin panel and stringer proximate to the end of the stringer (block 612). For example, a gap filler material 312 such as fiberglass is disposed in a gap 308 formed between the end 200 of the stringer 102 and the end of the adhesive 304. Thus, the gap filler material 312 is disposed at the runout region 203 of the skin-stringer assembly 100 instead of the adhesive 304.

In some examples, the method 600 of FIG. 6 includes processing the skin-stringer layup (block 614) by, for example, applying heat and/or pressure effects to the layup and cooling the heated layup. As discussed herein, the materials of the stringer 102, the skin 104, the adhesive 304, and/or the gap filler material 312 can be selected so as to provide for compatibility between the materials with respect to thermal and/or mechanical material properties to reduce and/or prevent the formation of defects during expansion and contraction of the layup.

In some examples, the method 600 of FIG. 6 includes coupling the stringer to the skin panel via mechanical fastener(s) disposed proximate to the end of the stringer (block 616). For example, in view of the termination of the adhesive prior to the end 200 of the stringer 102, the mechanical fastener(s) 316 can be used to couple the skin 104 to the stringer 102 at the end 200 of the stringer 102. As result, loads transfers between the stringer 102 and the skin 104 can occur via the mechanical fastener(s) 316 at the runout region 203, which reduces the effects of shear stresses associated with the adhesive 304 on the skin 104. In some examples, the method 600 of FIG. 6 includes installing the skin-stringer assembly in a vehicle such as an aircraft (block 618). For example, an end of the stringer 102 can be coupled to the rib 202. The example method 600 ends at block 620.

Although the example method 600 is described with reference to the flowchart illustrated in FIG. 6, many other methods of fabricating the example skin-stringer assembly 100 of FIGS. 1-3 may alternatively be used. For example, the order of execution of the blocks may be changed, and/or some of the blocks described may be changed, eliminated, or combined. Similarly, additional operations may be included in the skin-stringer assembly fabrication process before, in between, or after the blocks shown in FIG. 6.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed that provide for a skin-stringer assembly including design features that redirect stresses in the runout region of the assembly and improve strength and stability of the assembly. Example skin-stringer assemblies disclosed herein include an adhesive layer that terminates prior to the end of the stringer and a reinforcing layer (e.g., fiberglass) disposed between the end of the adhesive layer and the end of the stringer. As a result of the presence of the reinforcing material instead of the extension of the adhesive layer to the end of the stringer, shear stresses associated with the adhesive material are directed away from the runout region of the skin-stringer assembly. Further, design features of example skin-stringer assemblies disclosed herein such as a widened flange having tapered thickness proximate to the end of the stringer provide for a stable transition of stringer loads into the skin. Also, consideration of compatibility of the materials of the example skin-stringer assemblies avoids introducing structural weaknesses in the bonded joint that can result from processes such as laminate softening.

Clause 1. An apparatus comprising a skin structure and a support. The support includes a first surface, a second surface opposite the first surface, and a tapered edge extending from the first surface. The apparatus includes a first material disposed between a first portion of the support and a first portion of the skin structure to couple the second surface of the support to the skin structure and a second material disposed between a second portion of the support and a second portion of the skin structure, the second material different than the first material, the second portion of the support including at least a portion of the tapered edge.

Clause 2. The apparatus of clause 1, wherein the first material includes an adhesive.

Clause 3. The apparatus of clause 1 or 2, wherein the second material includes fiberglass.

Clause 4. The apparatus of any of the preceding clauses, wherein the first material extends a first length between the first portion of the support and the first portion of the skin structure and the second material extends a second length between the second portion of the support and the second portion of the skin structure, the first length greater than the second length.

Clause 5. The apparatus of any of the preceding clauses, wherein the tapered edge is disposed at an angle of approximately fifteen degrees relative to the first surface of the support.

Clause 6. The apparatus of any of the preceding clauses, further including a mechanical fastener disposed proximate to an end of second surface of the support.

Clause 7. The apparatus of any of the preceding clauses, wherein the support includes a flange, a width of a first portion of the flange greater than a width of a second portion of the flange.

Clause 8. The apparatus of clause 7, wherein a thickness of the second portion of the flange is less than a thickness of the first portion of the flange.

Clause 9. The apparatus of clause 7, wherein a thickness of the skin structure is increased proximate to the second portion of the flange relative to a thickness of the skin structure proximate to the second portion of the flange.

Clause 10. A layup including a skin, a stringer, and a first material disposed between the skin and the stringer. The first material extends a first length between the skin and the stringer. The example layup includes a second material disposed between the skin and the stringer. The second material is different than the first material. The second material extends a second length between the skin and the stringer. The second material is disposed between the first material and an end of the stringer.

Clause 11. The layup of clause 10, wherein the first length is greater than the second length.

Clause 12. The layup of clause 10 or 11, wherein the stringer includes a flange. A first portion of the flange has a first thickness and a second portion of the flange having a second thickness. The second thickness is less than the first thickness.

Clause 13. The layup of clause 12, wherein a width of the first portion of the flange is less than a width of the second portion of the flange.

Clause 14. The layup of clauses 12 or 13, wherein a thickness of the skin proximate to the second portion of the flange is greater than a thickness of the skin proximate to the first portion of the flange.

Clause 15. The layup of any of clauses 10-14, wherein the first material is an adhesive and the second material is fiberglass.

Clause 16. A method includes applying a first material between a first portion of a stringer and a first portion of a skin structure to couple the first portion of the stringer to the first portion of the skin structure. An end of the first material and an end of the stringer are to define a gap therebetween. The method includes applying a second material in the gap. The second material is different than the first material.

Clause 17. The method of clause 16, further including coupling a second portion of the stringer and a second portion of the skin structure proximate to the gap via a mechanical fastener.

Clause 18. The method of clauses 16 or 17, wherein the first material includes an adhesive.

Clause 19. The method of any of clauses 16-18, wherein the second material includes fiberglass.

Clause 20. The method of any of clauses 16-19, further including increasing a thickness of the skin structure proximate to the end of the stringer.

Claus 21. The method of clause 20 further including tapering a portion of a flange of stringer proximate to the end of the stringer.

Clause 22. The method of any of clauses 16-21, further including tapering an edge of a web of the stringer proximate to the end of the stringer.

Clause 23. The method of any of clauses 16-22, further chamfering an end of a flange of the stringer Clause 24. A method for distributing a load in a skin-stringer assembly including coupling an end of a stringer of the skin-stringer assembly to a rib of an aircraft. The skin-stringer assembly includes a bonding layer disposed between a first portion of the stringer and a first portion of a skin and a stress distribution layer disposed between a second portion of the stringer and a second portion of the skin, a material of the bonding layer different than a material of the stress distribution layer. The stress distribution layer is disposed proximate to the end of the stringer. The method includes distributing a load between the stringer and the skin via the stress distribution layer. The stress distribution layer is to affect a distribution of shear stress associated with the bonding layer when the skin-stringer assembly is exposed to the load.

Clause 25. The method of clause 24, wherein the skin-stringer assembly includes a fastener disposed proximate to the end of the stringer, the fastener to further distribute the load between the stringer and the skin.

Clause 26. The method of clauses 24 or 25, wherein the stringer includes a flange, at least a portion of the flange to flex with the skin when the skin-stringer assembly is exposed to the load.

Clause 27. The method of clause 26, wherein a first portion of the flange has a greater area than a second portion of the flange, the first portion disposed proximate to the end of the stringer to enable the skin and the stringer to remain coupled when the flange flexes with the skin.

Clause 28. The method of any of clauses 24-27, wherein the material of the bonding layer includes an adhesive and the material of the stress distribution layer includes fiberglass.

Clause 29. The method of any of clauses 24-28, wherein the stress distribution layer is to absorb at least a portion of the shear stress.

Clause 30. The method of any of clauses 24-29, wherein the stringer is to flex with the skin when the skin-stringer assembly is exposed to the load.

Clause 31. An apparatus including a skin panel, a stringer, a bonding material extending between a first portion of the skin panel and a first portion of the stringer, the bonding material to couple the first portion of the skin panel to the first portion of the stringer, and a stress distribution material extending between a second portion of the skin panel and a second portion of the stringer, the stress distribution material to affect a distribution of a load between the skin panel and the stringer.

Clause 32. The apparatus of clause 31, wherein the bonding material extends a first length between the first portion of the skin panel and the first portion of the stringer and the stress distribution material extends a second length between the second portion of the skin panel and the second portion of the stringer, the second length different than the first portion.

Clause 33. The apparatus of clauses 31 or 32, wherein the stringer includes a flange, an end of the flange including a chamfer.

Clause 34. The apparatus of any of clauses 31-33, wherein the stringer includes a flange, the flange having a first thickness at the first portion of the stringer and a second thickness at the second portion of the stringer, the first thickness greater than the second thickness.

Clause 35. The apparatus of any of clauses 31-34, wherein the skin panel has a first thickness at the first portion of the skin panel and a second thickness at the second portion of the skin panel, the second thickness greater than the first thickness.

Clause 36. The apparatus of any of clauses 31-35, wherein the stress distribution material includes fiberglass.

Clause 37. The apparatus of any of clauses 31-36, wherein the stringer includes a web, the web having a tapered edge.

Clause 38. The apparatus of any of clauses 31-37, wherein the bonding material is adjacent the stress distribution material.

Clause 39. A method including distributing stresses associated with a load on a skin-stringer assembly via a bonding layer at a first portion of the skin-stringer assembly, wherein at the first portion of the skin-stringer assembly, the bonding layer extends between a first portion of a skin of the skin-stringer assembly and a first portion of a stringer of the skin-stringer assembly, and distributing the stresses associated with the load via a stress distribution layer at a second portion of the skin-stringer assembly, wherein at the second portion of the skin-stringer assembly, the stress distribution layer extends between a second portion of the skin and a second portion of the skin-stringer assembly, the bonding layer including a first material and the stress distribution layer including a second material, the second material different than the first material.

Clause 40. The method of clause 39, wherein the stringer is to flex with the skin in response to the load.

Clause 41. The method of any of clauses 39 or 40, wherein the second portion of the skin-stringer assembly is disposed proximate to an end of the skin-stringer assembly.

Clause 42. The method of clause 41, wherein distributing the stresses at the second portion of the skin-stringer assembly via the stress distribution layer is to causes the stresses at the second portion to be directed away from the end of the skin-stringer assembly.

Clause 43. The method of any of clauses 39-42, wherein the first material includes an adhesive and the second material includes fiberglass.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a skin structure;
a support including:
 a first surface;
 a second surface opposite the first surface, the second surface facing the skin structure; and
 a tapered edge extending from the first surface;
a first material disposed in a first portion of a gap defined between a first portion of the support and a first portion of the skin structure, the first portion of the support including a portion of the second surface of the support, the first material to couple the portion of the second surface of the support to the skin structure; and
a second material disposed in a second portion of the gap defined between a second portion of the support and a second portion of the skin structure, the second material different than the first material, the second portion of the support including at least a portion of the tapered edge.

2. The apparatus of claim 1, wherein the first material includes an adhesive.

3. The apparatus of claim 1, wherein the second material includes fiberglass.

4. The apparatus of claim 1, wherein the first material extends a first length between the first portion of the support and the first portion of the skin structure and the second material extends a second length between the second portion of the support and the second portion of the skin structure, the first length greater than the second length.

5. The apparatus of claim 1, wherein the tapered edge is disposed at an angle of approximately fifteen degrees relative to the first surface of the support.

6. The apparatus of claim 1, further including a mechanical fastener disposed proximate to an end of the second surface of the support.

7. The apparatus of claim 1, wherein the support includes a flange, a width of a first portion of the flange greater than a width of a second portion of the flange.

8. The apparatus of claim 7, wherein a thickness of the second portion of the flange is less than a thickness of the first portion of the flange.

9. The apparatus of claim 7, wherein a thickness of the skin structure is increased proximate to the second portion of the flange relative to a thickness of the skin structure proximate to the second portion of the flange.

10. The apparatus of claim 1, wherein the first portion of the support is adjacent the second portion of the support.

11. The apparatus of claim 1, wherein the first material is not disposed in the second portion of the gap and the second material is not disposed in the first portion of the gap.

12. A method comprising:
applying a first material in a first portion of a gap defined between a first portion of a support and a first portion of a skin structure, the support including a first surface and a second surface opposite the first surface, the second surface facing the skin structure, the first portion of the support including a portion of the second surface of the support, the first material to couple the first portion of the support to the first portion of the skin structure; and
applying a second material in a second portion of the gap defined between a second portion of the support and a second portion of the skin structure, the second portion of the support including at least a portion of a tapered edge extending from a first surface of the support, the second material different than the first material.

13. The method of claim 12, further including coupling the second portion of the support and the second portion of the skin structure proximate to the second portion of the gap via a mechanical fastener.

14. The method of claim 12, wherein applying the first material includes applying the first material to extend a first length between the first portion of the support and the first portion of the skin structure and applying the second material includes applying the second material to extend a second length between the second portion of the support and the second portion of the skin structure, the first length greater than the second length.

15. The method of claim 12, wherein the first material includes an adhesive.

16. The method of claim 12, wherein the second material includes fiberglass.

17. The method of claim 12, further including increasing a thickness of the skin structure proximate to an end of the support.

18. The method of claim 17, further including tapering a portion of a flange of the support proximate to the end of the support.

19. The method of claim 17, further including tapering the edge the support proximate to the end of the support.

20. The method of claim 12, wherein applying the second material includes applying the second material adjacent the first material.

* * * * *